Feb. 10, 1925.  1,526,162
W. A. McCOLLUM
METHOD AND MEANS FOR TESTING ELECTRIC CIRCUITS
Filed Dec. 22, 1920

Inventor.
William A McCollum
by A. P. Grieley attorney.

Patented Feb. 10, 1925.

1,526,162

UNITED STATES PATENT OFFICE.

WILLIAM A. McCOLLUM, OF SAN ANTONIO, TEXAS.

METHOD AND MEANS FOR TESTING ELECTRIC CIRCUITS.

Application filed December 22, 1920. Serial No. 432,576.

*To all whom it may concern:*

Be it known that I, WILLIAM A. McCOLLUM, a citizen of the United States, residing at San Antonio, in the county of Bexar, State of Texas, have invented certain new and useful Improvements in Methods and Means for Testing Electric Circuits, of which the following is a description, reference being had to the accompanying drawings, forming a part hereof.

My invention relates to method and means for testing electric circuits and has for its object to provide an apparatus which will be adapted for testing coils and other electrical apparatus, and will also be adapted to test high tension magneto armatures including condensers, and primary and secondary windings.

A further object of the invention is to provide a method and apparatus by which magneto armatures may be tested under the conditions under which they are required to operate.

A further object of the invention is to provide an apparatus for the purpose indicated which will be simple in construction, not liable to get out of order which will clearly show the results of the tests and which may be used by comparatively unskilled workmen.

With the objects above indicated and other objects hereinafter explained, my invention consists in the method and apparatus hereinafter described and claimed.

Figure 1:
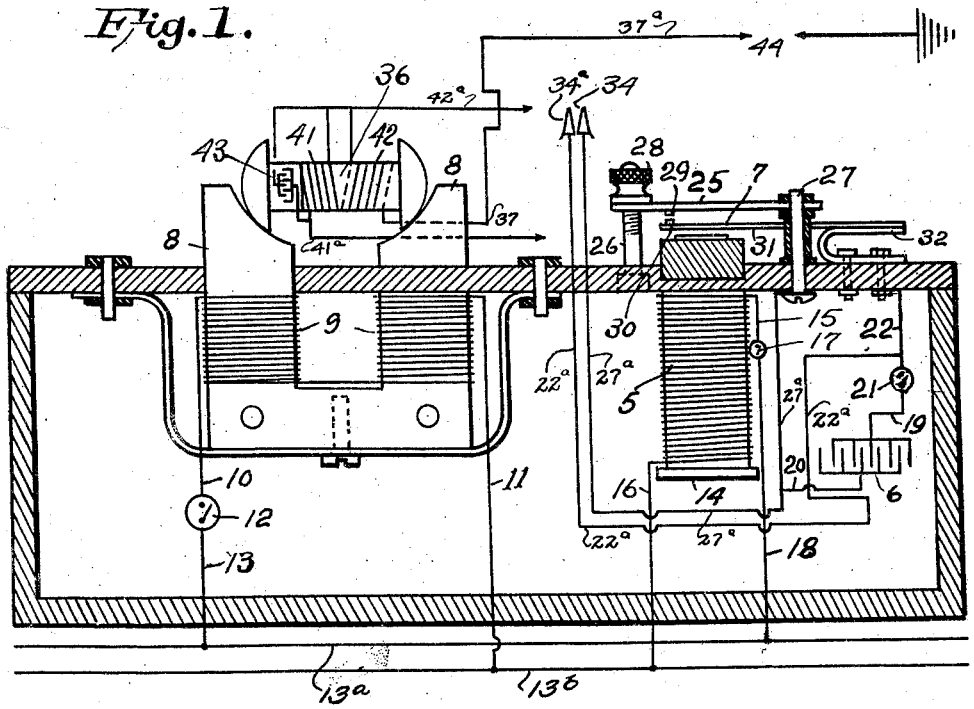
Figure 2:
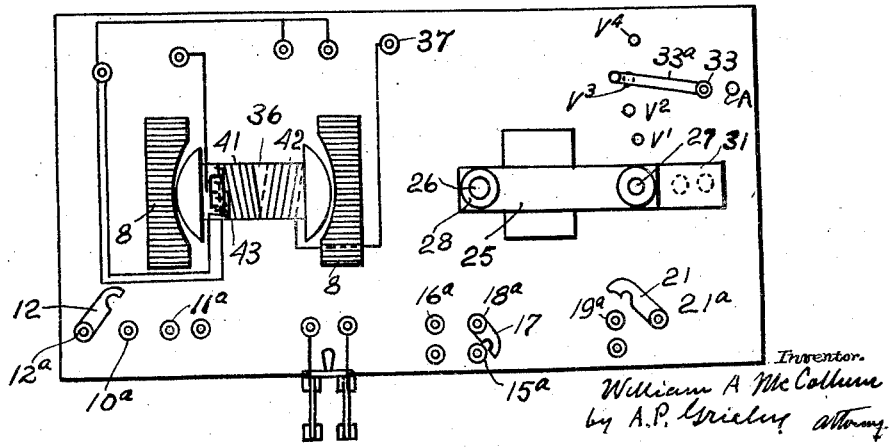

Figure 1 is a vertical sectional diagrammatic view of a testing set embodying my invention, and Fig. 2 is a plan view of the testing set.

In the drawing 8, 8, indicate the poles of an electro-magnet of the horseshoe type, preferably with laminated cores on which are wound coils 9, the wire 10 attached to the terminal $10^a$ of these coils leading to a switch 12 by which it is connected with wire 13, attached to terminal $12^a$ of switch 12 which is connected with a source of current here shown as a wire $13^a$ carrying an alternating current of about 110 volts. Wire 11 is here shown as connected to the terminal $11^a$ and to the return wire $13^b$ of the alternating current supply.

5 indicates what may be termed an electromagnetic coil adapted to act on a suitable core to energize it to attract a vibrator 7. This coil 5 is mounted on a base 14 and its terminal 15 leads to a pole $15^a$ of a switch 17 by which it is connected to wire 18 through the pole $18^a$ which is connected with a source of current, here shown as the wire $13^a$ of the alternating current supply. The wire 16 of the coil 5 is connected to a terminal $16^a$ and to a return and is here shown as connected to the wire $13^b$.

The board is further provided with a post 33 on which is pivoted a switch $33^a$ adapted to move over and contact with posts arranged in an arc about the post 33 as a center and marked $V^1$, $V^2$, $V^3$, $V^4$ and with a post A.

The vibrator 7 is mounted at one end on a spring 32 and its free end extends over the upper end of the coil 5 and is provided with a contact 30 adapted to make contact with contact 29 which is carried by a bar 25 supported at one end on post 27 and at the other end on post 26 which is provided, above the bar with a thumbscrew 28 by which the position of the bar may be regulated. The contacts 29 and 30 are normally in contact. The post 27 is connected by wire $27^a$ with a terminal 34, the portion of wire $27^a$ above the top plate being flexible and of such length that the terminal 34 may be brought in contact with the armature or coil to be tested. From this wire $27^a$ a wire 20 leads to a condenser 6, the other wire 19 of which leads to a terminal $19^a$ on a switch 21 by which it may be connected to a wire 22 which is connected to spring 32.

Wire 22 is also connected to wire $22^a$ which extends above the top plate and has at its end a terminal $34^a$, the portion of the wire above the top plate being flexible and, like the corresponding portion of wire $27^a$, of sufficient length to be brought into contact with the armature or other article to be tested.

37 indicates a post from which leads a grounded wire $37^a$ having a spark gap 44 in it.

In testing an armature of the magneto-generator type such as is shown at 36, having a primary winding 41, a secondary winding 42 and a condenser 43, the armature is placed on the poles 8 which project above the top plate and are shaped to receive the ends of the armature, and the switch 12 is operated to connect the coils 9 with the source of current. The effect of the passage of the current through the coils 9 is to induce an alternating current in the coils 41 and 42 of the armature.

By placing a strip of magnetic metal, such as a knife blade or a hack saw blade in contact with the armature core and closing the field circuit by means of switch 12 it will at once be apparent whether or not there is a short circuit or ground due to broken insulation or any metallic contact between the winding and core, as if any such defect exists the metallic strip will chatter.

The terminals 34 and 34$^a$ are then brought in contact with opposite ends of windings 41 and 42. This completes a circuit through wire 27$^a$, post 27, bar 25, contact 29, contact 30, vibrator 7, spring 32, wire 22 to terminal 34$^a$. On breaking this circuit there will be sparking if the circuit through the winding to the ends of which the terminals 34, 34$^a$ were applied is complete. If there is no sparking there is a break in this winding. By means of these terminals 34 and 34$^a$ individual coils of the winding may be readily tested in the same way.

The apparatus is adapted for making the above described tests on the coils of any armature or electro-magnet or other coil which may be placed in inductive relation to the poles 8 and is thus adapted for the general testing of the electrical devices used in connection with an automobile or for other purposes.

The apparatus of my invention is, however, particularly adapted for testing a magneto-generator armature of the type above indicated, under the conditions under which it is to operate, the apparatus reproducing all of these conditions except that in the testing the armature is stationary instead of rotating so that whatever effect may be due to centrifugal force is not indicated.

In this testing, the armature being placed, as above described, on the poles 8 with the terminal of the secondary winding 42 in circuit with post 37, the switch 17 is closed, closing the circuit through the coil 5. The passage of the current through the coil 5 causes the vibrator 7 to be alternately attracted and released separating the contacts 29 and 30 and permitting them to again come in contact. The terminals 34 and 34$^a$ are then connected with the ends of the windings indicated at 41$^a$ and 42$^a$ thus closing circuit through the primary winding 41 and condenser wire 27$^a$, post 27, bar 25, contact 29, contact 30, vibrator 7, spring 32, and wire 22, the circuit being broken and made at the contacts 29, 30 by the vibration of the vibrator 7. The effect of this, the making and breaking of the circuit being synchronous with the alternations of the current induced in the windings of the armature, is to high tension alternating current and to cause a current to be induced in the secondary winding 42 of such high tension that it will cause a spark at the spark gap 44 if the condenser 43 is in working order. If the windings 41 and 42 have been previously tested, as above described, and have been found to be free from short circuits, grounds or breaks, a failure to show a spark at the spark gap indicates that the condenser is not in working order. In order to determine this with certainty, the switch 21 is closed putting the condenser 6 in circuit between wire 27$^a$ and wire 22. If there is then sparking at the spark gap 44 it is evident that all that was needed to cause the sparking was a condenser, and that except for condenser 43 the armature is in working condition.

It will of course be understood that I do not desire to be limited to the particular construction and arrangement shown and described, the apparatus shown being, as regards the method, illustrative only.

Having thus described my invention what I claim is:

1. In a testing apparatus an electro-magnet having poles adapted to receive between them the apparatus to be tested and having its coils adapted to be connected with a source of alternating current, a circuit having terminals adapted to be connected with opposite ends of a winding of the apparatus to be tested and making and breaking means for said circuit, means including an electro-magnetic coil adapted to be connected with the source of and in multiple with the first above mentioned electro-magnet for operating said making and breaking means synchronously with the alternations of the current induced in said winding of the apparatus to be tested, and a grounded circuit having a spark gap therein connected with a coil in inductive relation to the winding to be tested.

2. In a testing apparatus an electro-magnet having poles adapted to receive between them the apparatus to be tested and having its coils adapted to be connected with a source of alternating current, a circuit having terminals adapted to be connected with opposite ends of a winding of the apparatus to be tested and making and breaking means for said circuit, means including an electro-magnetic coil adapted to be connected with the source of and in multiple with the first above mentioned electro-magnet for operating said making and breaking means synchronously with the alternations of the current induced in said winding of the apparatus to be tested comprising a vibrator and a coil for operating it adapted to be connected with a source of alternating current, and a grounded circuit having a spark gap therein connected with a coil in inductive relation to the winding to be tested.

3. In a testing apparatus an electro-magnet having poles adapted to receive between them the apparatus to be tested and having its coils adapted to be connected with a source of alternating current, a circuit having terminals adapted to be connected with opposite ends of a winding of the apparatus to be tested and making and breaking means for said circuit, means for operating said making and breaking means synchronously with the alternations of the current induced in said winding of the apparatus to be tested comprising a vibrator and a coil for operating it adapted to be connected with a source in multiple with the electromagnet, a grounded circuit having a spark gap therein connected with a coil in inductive relation to the winding to be tested, and a condenser and means for introducing it in connection with the circuit of the winding to be tested.

4. The method of testing an armature or other electrical device having a primary and secondary winding and a condenser, consisting in inducing a current in the windings, connecting the secondary winding with a grounded circuit provided with means for indicating the passage of current, and making and breaking the current induced in the primary winding synchronously with the alternations of said induced current.

5. The method of testing an armature or other electrical device having a primary and secondary winding and a condenser, consisting in inducing a current in the windings, connecting the secondary winding with a grounded circuit provided with means for indicating the passage of current, and making and breaking the current induced in the primary winding synchronously with the alternations of said induced current, and introducing a condenser in connection with the circuit of the primary winding.

In testimony whereof I affix my signature this 13th day of December 1920.

WILLIAM A. McCOLLUM.